United States Patent [19]

Hashimoto et al.

[11] Patent Number: 4,804,988
[45] Date of Patent: Feb. 14, 1989

[54] INSTANT FILM PACK

[75] Inventors: Masafumi Hashimoto; Minoru Ono, both of Kanagawa, Japan

[73] Assignee: Fuji Photo Film Co., Ltd., Kanagawa, Japan

[21] Appl. No.: 107,584

[22] Filed: Oct. 13, 1987

[30] Foreign Application Priority Data

Oct. 13, 1986 [JP] Japan .......................... 61-155628[U]

[51] Int. Cl.⁴ .............................................. B65D 85/67
[52] U.S. Cl. .................................... 354/276; 3546/86; 3546/455; 206/316
[58] Field of Search ................... 206/316; 354/85, 86, 354/76, 304, 276, 455

[56] References Cited

U.S. PATENT DOCUMENTS

| | | | |
|---|---|---|---|
| 3,899,337 | 8/1975 | Nestor, Jr. ............................ | 354/86 |
| 4,192,593 | 3/1980 | Norris .................................. | 354/86 |
| 4,201,457 | 5/1980 | Erlichman ........................... | 354/86 |
| 4,236,798 | 12/1980 | Sylvester .............................. | 354/86 |
| 4,318,601 | 3/1982 | Martin .................................. | 354/86 |
| 4,461,556 | 7/1984 | Douglas ................................ | 354/86 |
| 4,637,703 | 1/1987 | Ono et al. ............................ | 206/316 |

*Primary Examiner*—David T. Fidei
*Attorney, Agent, or Firm*—Young & Thompson

[57] ABSTRACT

In an instant film pack of the type comprising a parallel-epipedal housing having a top wall in which an exposure aperture is formed and a front end wall with a film unit exit slot through which an instant film unit is withdrawn. A supporting member is provided to prevent the film unit from being improperly withdrawn. The supporting member comprises a pair of resilient arms attached to the bottom of the film pack at the front end and extending in the direction of withdrawal of the film unit. The resilient arms are so formed as to extend close to the juncture of the front end of a guide member and an edge controller disposed in a pack holder in which the film pack is loaded for use.

8 Claims, 4 Drawing Sheets

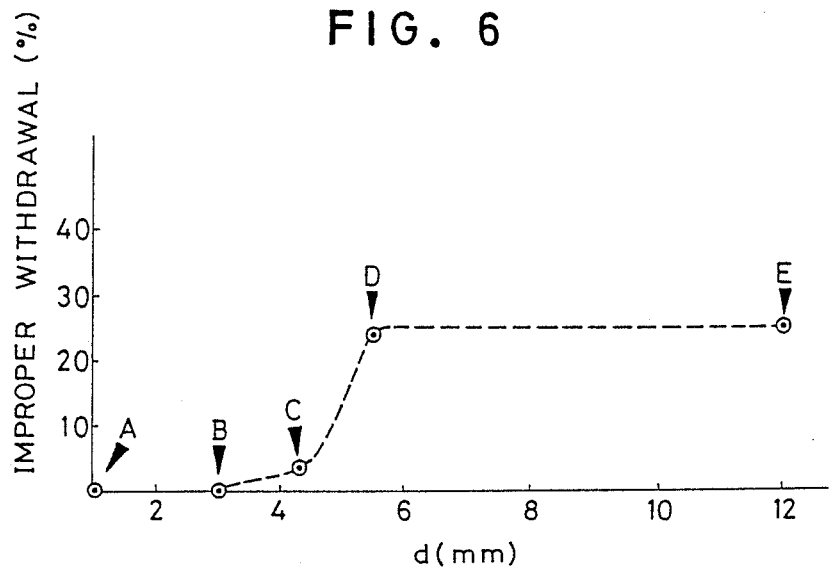

INSTANT FILM PACK

BACKGROUND OF THE INVENTION

The present invention relates to an instant film pack in which peel-apart type instant film units are contained and removably held.

Certain types of instant film units of the diffusion transfer type are generally contained in a film cassette or film pack in stacked relation and are removably held therein. Especially a peel-apart type instant film unit (which is hereinafter referred to as a film unit for simplicity of description), as is disclosed in detail in Japanese Patent Publ. No. 44-2528 for example, basically comprises a photosensitive sheet for forming a latent image thereon and an image-receiving sheet adapted to be registered with the photosensitive sheet for processing in order to form a positive image of the latent image thereon. The film unit is designed to superpose the separate sheets relative to each other after exposure, for diffusion transfer processing. For this purpose, the photosensitive sheet is connected with a carrier sheet and, on the other hand, the image-receiving sheet has superposed thereon a mask sheet having an aperture by which an image-receiving area is defined thereon. The mask sheet is coupled to the carrier sheet.

Such film units are contained in stacked relation in a film pack which has a film unit exit slot at its front end and is used in cooperation with a camera back or a pack holder provided with a pair of pressure-applying members in the form of elongated rollers for applying compressive pressure to the superposed sheets so as to distribute processing liquid therebetween while the exposed sheets are withdrawn from the pack holder.

Upon withdrawing an exposed film unit, a tab relatively weakly connected to the carrier sheet at its leading end is at first withdrawn through a tab exit slot in the pack holder formed apart from the film unit exit slot so that the leading end of the carrier sheet emerges from the pack holder to allow access thereto for withdrawal. When the tab is further withdrawn, the tab is disconnected form the carrier sheet, and the leading end of the carrier sheet proceeds between the pressure-applying rollers. By withdrawing the leading end of the carrier sheet, the photosensitive sheet and the image-receiving sheet are drawn between the pressure-applying rollers and superposed in proper registry relative to each other.

Inside the pack holder there is a guide plate for directing the leading end of the carrier sheet withdrawn form the film pack toward and between the pressure-applying rollers. Between the front end of the guide plate and the pressure-applying rollers there is an edge controlling member disposed for compressively grasping the side edges of the superposed photosensitive and image-receiving sheets to positionally restrict the sheets and to prevent any escape of processing liquid distributed therebetween. This edge controlling member is suspended by a spring member for upward and downward displacement and guides the carrier sheet, and hence the film unit, toward the pressure-applying rollers in cooperation with the guide plate.

Meanwhile, when assembling the pack holder, there is often a difference in level between the front edge of the guide plate and the edge controlling member due to manufacturing and/or assembling errors. Such a level difference will block the progress of the leading end of the carrier sheet. For avoiding the level difference, a fine adjustment of the spring force can be performed or an improved supporting mechanism can be provided for the edge controller. These countermeasures are, however, accompanied by great technical difficulties and costly.

For the reason stated above, there is thus a substantial chance that the leading end of the carrier sheet will not enter properly between the pressure-applying rollers; and this prevents the instant film unit from successfully emerging from the pack holder even though the tab is properly pulled out. In particular, in case the tab is pulled and deviated laterally right or left, one of left and right edges of the forward end of the carrier sheet is liable to deflect downwardly, resulting in improper withdrawals of film units.

OBJECT OF THE INVENTION

It is therefore an object of the present invention to provide an instant film pack which enables the carrier sheet of the instant film unit reliably to enter between a pair of pressure-applying members as the result of pulling the tab member of the instant film unit out of a pack holder.

It is another object of the present invention to provide an instant film pack which enables the instant film unit to be withdrawn reliably from the pack holder.

SUMMARY OF THE INVENTION

According to the present invention, the instant film pack comprises a parallelepipedal film housing having a flat top with an exposure aperture formed therein and a front end wall with a film unit exit slot through which the instant film units are withdrawn; and instant film supporting means attached to the bottom of the film housing and extending in the direction of withdrawal of the instant film units, the supporting means, which is a resilient member, being so disposed as to force the leading end of the carrier sheet upwardly. That is, when the film pack is placed in the pack holder, the forwardmost end of the resilient supporting member is positioned close to a border between the guide plate and the edge controller disposed in the pack holder. Due to the provision of the resilient supporting member, since the leading end of the carrie sheet of the film unit is supported by the resilient supporting member so as to be close to the border, the leading end of the carrier sheet is prevented from being intercepted and/or bent or damaged by the level difference between the front edge of the guide plate and the edge controlling member.

BRIEF DESCRIPTION OF THE DRAWINGS

The above and other objects and features of the present invention will become more apparent to those skilled in the art from the following detailed description with reference to the accompanying drawings wherein like parts are denoted by like reference numerals throughout the several views of the drawings and in which:

FIG. 6 is a graph of a curve showing the experimental relation between the number of improper withdrawals of instant film units and the distance between the front end of the supporting member and the edge controller.

DETAILED DESCRIPTION OF THE INVENTION

Figure 1:
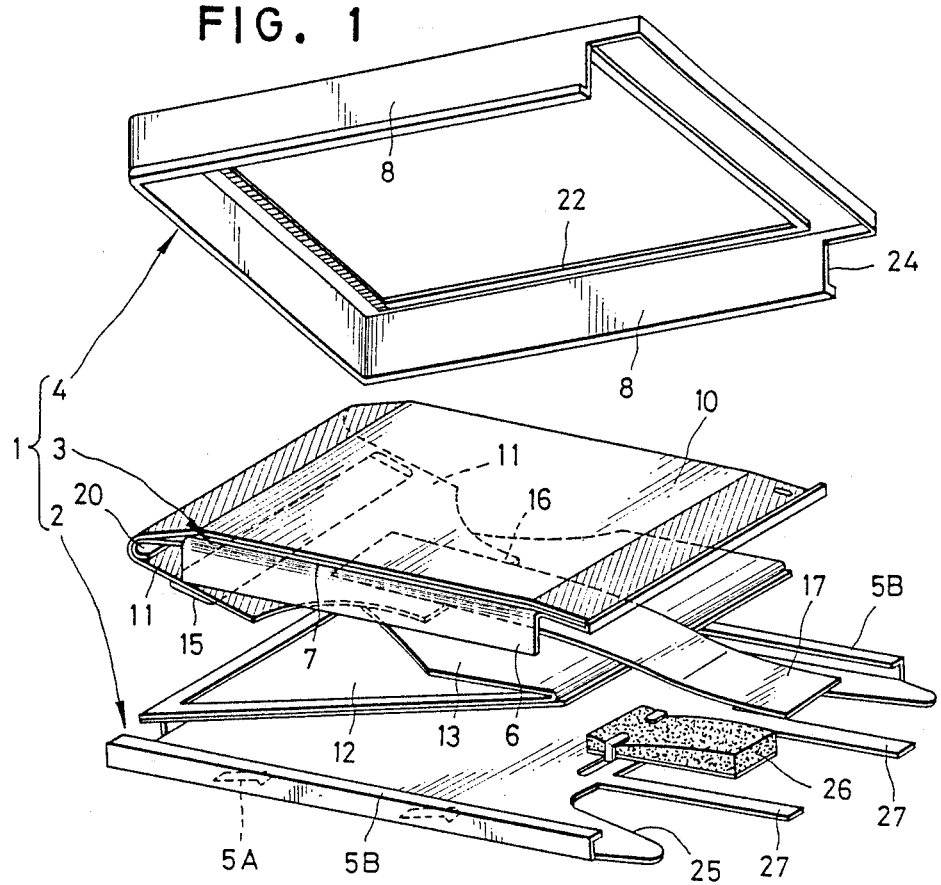
FIG. 1 is an exploded perspective view of an instant film pack depicted with a single peel-apart type instant film unit.

Referring now to FIG. 1, shown therein in an exploded perspective view is a generally parallelepipedal film pack 1 embodying the present invention. The film pack 1 comprises a base 2 formed of thin resilient sheet metal, a top housing 4 formed of, for example, a high-impact polystyrene material and a pressure plate 3 made of sheet metal. The base 2 is provided with spring tabs 5A and inwardly turned longitudinally extending flanges 5B on opposite sides thereof. The top housing 4 is provided with downwardly extending longitudinal side walls 8 having outwardly turned longitudinal flanges adapted to resiliently engage beneath the flanges 5B for forming the film pack 1 so as to enclose the pressure plate 3 and a plurality of film units therein. The spring tabs 5A are bent upwardly and are adapted to resiliently engage downwardly extending longitudinal walls 6 on the pressure plate 3 for urging the pressure plate 3 upwardly. The top housing 4 includes a generally rectangular flat wall in which an exposure aperture 22 is defined.

A film unit contained in the film pack 1 basically includes a photosensitive sheet 10 comprising any of the commonly used flexible sheet materials, an image-receiving sheet 12 also comprising a conventional flexible sheet material and a carrier sheet 11 attached to a mask sheet 13. The carrier sheet 11 with its trailing end connected to the photosensitive sheet 10 and its leading end attached to a withdrawing tab 17 is adapted to function as a leader. The mask sheet 13 has a leading section connected to the middle of the carrier sheet 11 and a trailing section which comprises a mask for confining a processing liquid between the photosensitive and image-receiving sheets 10 and 12, properly registering the sheets 10 and 12 relative to each other when the sheets 10 and 12 are superposed, and supporting a pod 15 containing a processing liquid.

The photosensitive sheet 10 is disposed on the flat surface of the pressure plate 3 and the carrier sheet 11 passes around a curved portion 20 formed at one end of the pressure plate 3 and extends behind the rear thereof. The image-receiving sheet 12 and the mask sheet 13 bearing the image-receiving sheet 12 are accommodated in a space formed between the pressure plate 3 and the base 2.

In the same way as described above, a plurality of the film units are contained in the film pack in stacked relation, and the foremost photosensitive sheet 10 is pressed against the frame of the top housing 4 so as to be positioned for exposure. The positioning of the foremost photosensitive sheet 10 is effected through the engagement between the spring tabs 5A and the downwardly extending walls 6 of the pressure plate 3.

For withdrawing exposed film units, there is provided an exit slot 24 on one side of the top housing 4. Corresponding to the exit slot 24, the base 2 is formed with a substantially U-shaped opening 25 therein and provided with a pair of supporting arms 27 formed integrally therewith. The supporting arms 27 extend in the direction of withdrawal. Disposed between the supporting arms 27 is a sponge pad 26 extending in the direction of withdrawing at the middle of the opening 25. The sponge pad 26, when the film pack is held in the pack holder, is slightly pushed up by, for example, a projection on the inner surface of the pack holder so as to thrust up the film units in order to make it easy to withdraw the film unit.

Figure 2:
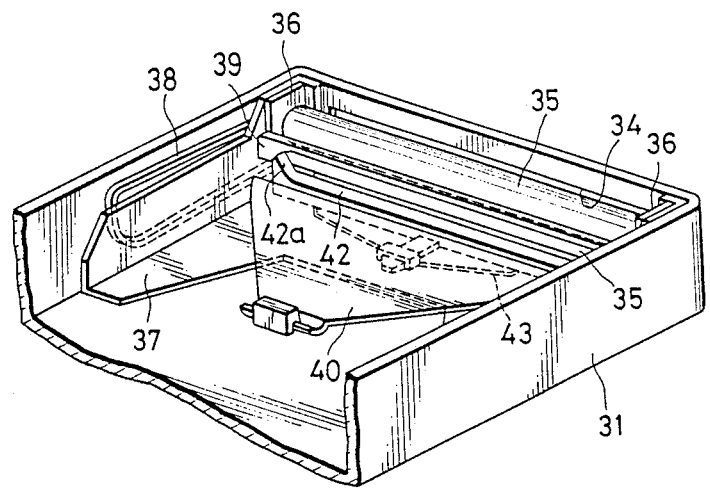
FIG. 2 is a perspective illustration showing a part of a pack holder in which the instant film pack of FIG. 1 is loaded for use.
Figure 3:
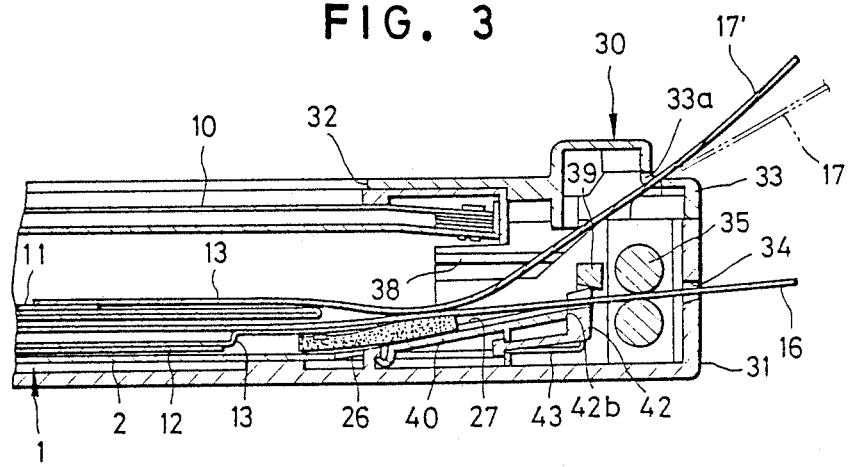
FIG. 3 is a longitudinal sectional view of a film pack loaded in a pack holder and holding s single peel-apart type instant film unit.

Reference is now had to FIGS. 2 and 3 showing the interior mechanism of the pack holder for withdrawing film units. The pack holder 30 in which the film pack 1 is loaded comprises a holder housing 31 and a housing cover 33 formed with an exposure aperture 32 defining an image area on the photosensitive sheet 10. The holder housing 31 and the housing cover 33 are hinged to each other in any well known manner to open and close. In use, the pack holder 30 is attached to a camera in such a way to make the exposure aperture 32 of the housing cover 33 and an exposure aperture of the camera come closely into contact with each other. At the end of the housing cover 33 there is formed an exit slot 33a or the withdrawing tab 17.

In one side wall of the holder housing 31 there is an exit slot 34 through which the film unit is withdrawn after exposure. Adjacent to the film exit slot 34 there is a pair of pressure-applying members in the form of elongated rollers 35 mounted in the housing 31 for applying compressive pressure to the photosensitive and image-receiving sheets 10, 11. The pressure-applying rollers 35 are rotatably mounted on a base block 37 by means of bearing blocks 36. Axles at both ends of each pressure-applying roller 35 pass through the bearing blocks 36 and penetrate side walls of the base block 37. The axles of the pressure-applying rollers 35 are engaged by a generally U-shaped spring member 38 to create pressure between the rollers 35 while the photosensitive and image-receiving sheets 10, 11 pass therebetween. It is to be noted that the bearing blocks 36 provide a predetermined minimum gap less than the total thickness of the film sheets between the pressure-applying rollers 35 when there is no film unit therebetween. As is seen in FIG. 2, the side walls of the base block 37 are connected by means of a bridge member 39 integral therewith.

On the bottom wall of the holder housing 31 there is a guide plate 40 disposed with an inclination toward the exit slot 34 for directing the leading end 16 of the carrier sheet 11 to the exit slot 34 when the film unit is withdrawn. Between the pressure-applying rollers 35 and the guide plate 40 there is provided an edge controller 42 loosely mounted in the base block 37 and urged upwardly by means of a spring member 43 fixed to the base block 37. The edge controller 42 at both its ends has upwardly sloped portions 42a which are restrained from moving upward by means of the under surface of the bridge member 39. The edge controller 42 acts in cooperation with bridge member 39 not only to define a film unit passage but also to grasp side edges of the film unit at the sloped portions 42a. Due to the provision of the sloped portions 42a, the photosensitive and image-receiving sheets 10, 12 are accurately superposed on each other when they are withdrawn between the rollers 35 and are brought closely into contact at their edges, thereby preventing the processing liquid distributed therebetween from escaping from the edges.

After exposure, the film unit is withdrawn for processing. For withdrawing the film unit, the tab 17 extending outside the pack holder 30 passing through the tab exit slot 33a is grasped and pulled to force out the leading end 16 of the carrier sheet 11 through the film unit exit slot 34. The leading end 16 of the carrier sheet 11 slides over the upper surface of the sponge pad 26 to the right as viewed in FIG. 3 and is guided by the upper surface of the guide plate 40 to enter the gap between the pressure-applying rollers 35. Because this gap is wider than the thickness of the carrier sheet 11, the leading section 16 of the carrier sheet 11 passes freely between the pressure-applying rollers 35 and then through the film unit exit slot 34 to emerge from the pack holder 30 as is shown in FIG. 3. At this time, if the tab 17 is further pulled, the tab 17 is peeled apart from the carrier sheet 11. Simultaneously with this, a tab 17' of the following film unit emerges from the tab exit slot 33a.

For obtaining a printed image on the image-receiving sheet 12 by a diffusion transfer process which takes place outside the pack holder 30, the leading end 16 of the carrier sheet 11 is continuously withdrawn through the film unit exit slot 34. Upon this withdrawal of the carrier sheet 11, the photosensitive and image-receiving sheets 10, 12 are drawn between the pressure-applying rollers 35 and are superposed in proper registry relative to each other. As a result, the pressure-applying rollers 35 compressively rupture the processing liquid pod 15 to release the processing liquid, and distribute the processing liquid between the superposed sheets 10, 12, spreading the processing liquid in a thin, uniform layer therebetween. After a certain time after the film unit has been fully withdrawn from the pack holder 30, the photosensitive sheet 11 is peeled apart from the image-receiving sheet 12, to expose a positive image on the image-receiving sheet 12. The same operation is repeated for each successive film unit after every exposure.

Figure 4:
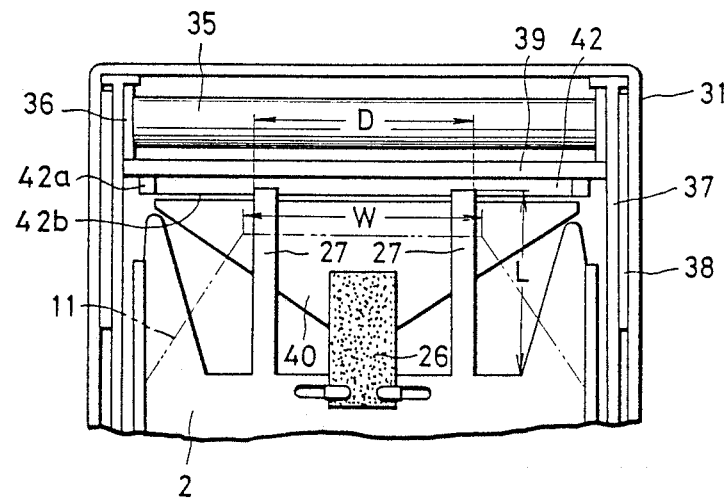
FIG. 4 is a fragmentary cross-sectional illustration showing a principal part of an instant film pack.

As was previously described, in the film pack 1 of this invention, the base 2 has supporting arms 27 extending in the direction of withdrawal of the film unit on both sides of the sponge pad 26. Because of the resiliency of the supporting arms 27, the supporting arms 27 are bent upwardly by the guide plate 40 when the film pack 1 is loaded in the pack holder 30 as is shown in FIG. 3. Each supporting arm 27 reaches the front end 42b of the edge controller 42 as is shown in FIGS. 3 and 4. The lateral distance D between the outer edges of the supporting arms 27 is less than the width W of the leading end 16 of the carrier sheet 11.

Thanks to the provision of the supporting arms 27, the leading end 16 of the carrier sheet 11 can be withdrawn without being forced downwardly and rides over the rear edge 42b of the edge controller 42 to enter reliably between the bridge 39 and the edge controller 42. Furthermore, even if the withdrawing tab 17 when pulled deviates to the right or left and the carrier sheet 11 is thus more or less deflected, since both sides of the leading end 16 of the carrier sheet 11 are supported by the respective supporting arms 27, the leading end 16 of the carrier sheet 11 is guided to positively enter the space previously provided between the edge controller 42 and the bridge member 39.

Figure 5:
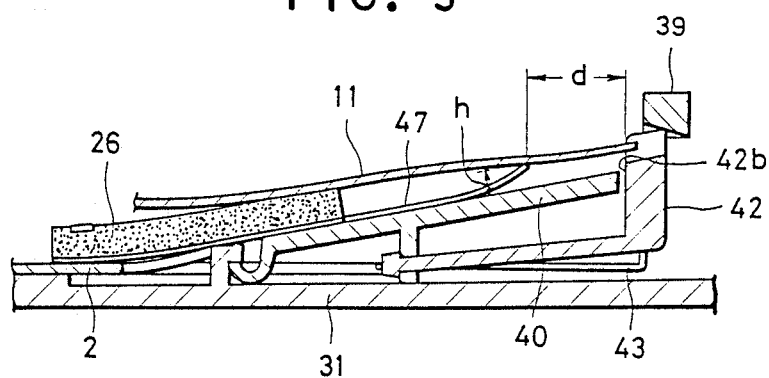
FIG. 5 is a longitudinal sectional view of a film pack of another embodiment of the present invention.

FIG. 5 shows another embodiment of the film pack of the present invention in which the forward ends of supporting arms 47 similar to the supporting arms 27 of the previously described embodiment are adjacent to but spaced from the rear edge 42b of the edge controller 42. The forward end of each supporting arm 47 is bent upwardly, and the height h of the bent end of the supporting arm 47 is about 2.5 mm. Thanks to this upwardly bent end of each supporting arm 47, the forward portion of the carrier sheet 11 is forced upwardly. As a consequence, even though there is a distance d between the forward end of the supporting arm 47 and the rear edge 42b of the edge controller 42, the leading end 16 of the carrier sheet 11 is prevented from being intercepted by the rear edge 42b of the edge controller 42. The provision of the supporting arms 47 with forward ends bent upwardly contributes to avoiding an accidental interception of leading end 16 of the carrier sheet 11 of the film units. It is to be noted that if the distance d becomes too great, the leading end 16 of the carrier sheet 11 will be directed downwardly before reaching the rear edge 42b of the edge controller 42 and will be intercepted by the edge controller 42 with an increased rate of improper withdrawal.

Reference is now had to FIG. 6, which illustrates the experimental results showing the relationship between the number of improper withdrawals of film units and the distance d in FIG. 5, thereby demonstrating the results of the invention. From this relationship, it will be apparent that the rate of improper withdrawal decreases as the distance d becomes small. In this graph, plotted points A, B, C, D and E on the curve represent the distances d between the front ends of the supporting arms 47 and the rear edge 42b of the edge controller 42 and are 0 mm, 3 mm, 4 mm, 5 mm, and 11.5 mm, respectively. It is evident from the experimental results shown in FIG. 6 that the relative number of improper withdrawals of film units is drastically reduced when the distance d between the front end of the supporting arms 47 and the rear edge 42b of the edge controller 42 is less than 5 mm, in comparison with the conventional film packs in the same pack holder 30. In any event, it is preferable that the supporting arms 27, 47 be formed integrally with the base 2; but if separately formed, the supporting arms 27, 47 may be adhered to the base 2.

Although the present invention has been fully described by way of preferred embodiments thereof with reference to the accompanying drawings, it is to be noted that various changes and modifications will be apparent to those skilled in the art. Therefore, unless otherwise indicated, such changes and modifications should be construed as included therein.

What is claimed is:

1. An instant film pack for containing and removably holding a plurality of peel-apart type instant film units having a carrier sheet for withdrawing said instant film unit, said instant film pack being adapted to be used with a pack holder having a pair of pressure-applying members and a guide member for directing said film unit toward said pressure-applying members and an edge controlling member for pressing longitudinal edges of said film unit, said film pack comprising:

a parallelepipedal housing having a flat top wall with an exposure aperture formed therein and a front end wall with an exit slot formed therein through which said instant film unit is withdrawn; and resilient supporting means fixedly attached to a bottom wall of said film pack at said front end and extending in the direction of withdrawal of said instant film unit for supporting said instant film units, said resilient supporting means being so formed as to extend and terminate no farther than a border between said edge controlling member and a front edge of said guide member.

2. An instant film pack as defined in claim 1, wherein said resilient supporting means is bent upwardly at its forward end portion.

3. An instant film pack as defined in claim 1, wherein said resilient supporting means comprises a pair of arms.

4. An instant film pack as defined in claim 3, further comprising a sponge pad which is attached to said bottom wall and is disposed between said pair of arms.

5. The combination of an instant film pack for containing and removably holding a plurality of peel-apart type instant film units having a carrier sheet for withdrawing said instant film unit, and a pack holder having a pair of pressure-applying members and a guide member for directing said film unit toward said pressure-applying members and an edge controlling member for pressing longitudinal edges of said film unit, said film pack comprising:

an parallelpipedal housing having a flat top wall with an exposure aperture formed therein and a front end wall with an exit slot formed therein through which said instant film unit is withdrawn; and resilient supporting means fixedly attached to a bottom wall of said film pack at said front end and extending in the direction of withdrawal of said instant film unit for supporting said instant film units, said resilient supporting means extending and terminating no farther than a border between said edge controlling member and a front edge of said guide member.

6. The combination defined in claim 5, wherein said resilient supporting means is bent upwardly at its forward end portion.

7. The combination defined in claim 5, wherein said resilient supporting means comprises a pair of arms.

8. The combination defined in claim 7, further comprising a sponge pad which is attached to said bottom wall and is disposed between said pair of arms.

* * * * *